Dec. 30, 1958 G. WEISSENBERG ET AL 2,866,712
OPTICAL CROWN GLASS
Filed Nov. 16, 1953
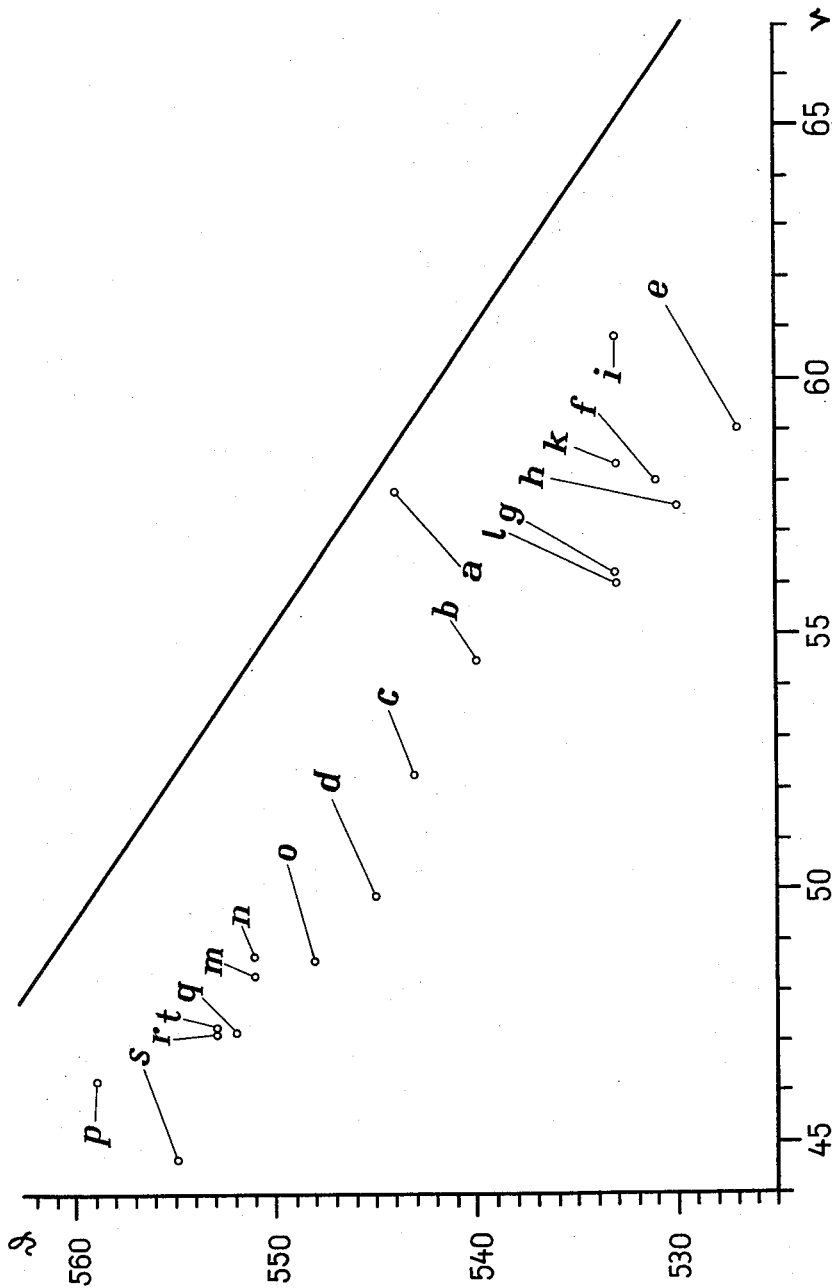
INVENTORS
Gustav Weissenberg
Otto Ungenach
BY Norbert Meinert
Benj. T. Rauber
their attorney

United States Patent Office 2,866,712
Patented Dec. 30, 1958

2,866,712
OPTICAL CROWN GLASS

Gustav Weissenberg and Otto Ungemach, Marburg (Lahn), and Norbert Meinert, Munchhausen, Kreis, Marburg, Germany Application November 16, 1953, Serial No. 392,434

Claims priority, application Germany November 22, 1952

3 Claims. (Cl. 106—47)

Our present invention relates to optical crown glass with anomalous partial dispersion, $$\vartheta = \frac{n_G - n_F}{n_F - n_C}$$

Under glass with anomalous partial dispersion are understood to be those glasses which in the known $v-\vartheta$ diagram for optical glass $$\left(v = \frac{n_D - 1}{n_F - n_C}\right)$$

lie outside of the straight line representing the function of $v-\vartheta$ for glasses hitherto known. The deviation from the straight line in the $v$ value is designated as $\Delta v$, in which $\Delta v$ may be positive or negative according to the position of the glass to the right or left of the straight line. Glasses with anomalous dispersions are especially valuable to the optical computer because with them it is possible to correct the secondary spectrum by means of a lens system. The field of our present invention is crown glasses with negative $\Delta v$ values.

We have found that optical glasses of high values with the desired negative $\Delta v$ values can be obtained by melting down a mixture of boric acid anhydride and zirconium oxide in the presence of a carbonate of an alkali metal (preferably of lithium or sodium or both) or a mixture of boric acid anhydrid, a metaborate of an element of the second group of the periodic system, zirconium oxide and lanthanum oxide.

In the following tables, examples of glass melts of our invention are given by way of illustration, not of limitation.

In the accompanying drawing is shown a graph in which the $\vartheta$ values and the $v$ values of these glasses are plotted, the straight line relationship of the glasses heretofore known being indicated by the straight line. The melts corresponding to the several values shown in the graph are indicated by corresponding identity letters in the column, $i-l$, in the tables between the $v$ and $\vartheta$ columns. The deviations $\Delta v$ for each melt are shown in the last column of the tables.

Table 1
[In percent by weight]

| Melt No. | B₂O₃ | Na₂CO₃ | ZrO₂ | $n_D$ | $v$ | $i-l$ | $\vartheta$ | $\Delta v$ |
|---|---|---|---|---|---|---|---|---|
| B 29 | 54.0 | 41.2 | 4.8 | 1.5297 | 57.8 | a | 0.544 | −1.2 |
| W 551 | 51.5 | 39.4 | 9.1 | 1.5417 | 54.5 | b | 0.540 | −6.7 |
| B 30 | | | | | | | | |
| W 553 | 49.3 | 37.6 | 13.1 | 1.5527 | 52.3 | c | 0.543 | −7.2 |
| B 31 | | | | | | | | |
| B 32 | 47.2 | 36.1 | 16.7 | 1.5655 | 49.9 | d | 0.545 | −8.5 |

Table 2
[In percent by weight]

| Melt No. | B₂O₃ | Li₂CO₃ | ZrO₂ | $n_D$ | $v$ | $i-l$ | $\vartheta$ | $v$ |
|---|---|---|---|---|---|---|---|---|
| B 34 | 62.3 | 32.9 | 4.8 | 1.5728 | 60.6 | i | 0.533 | −4.5 |
| B 35 | 59.5 | 31.4 | 9.1 | 1.5839 | 58.3 | k | 0.533 | −7.0 |
| B 36 | 56.9 | 30.1 | 13.0 | 1.5974 | 56.0 | l | 0.533 | −9.3 |

The glasses enumerated in the above two tables have the common characteristics that the boric acid anhydride content lies between 45% and 65%, the alkali carbonate content between 25% and 45% and the zirconium oxide content between 4% and 20%.

Table 3
[In percent by weight]

| Melt No. | B₂O₃ | Li₂CO₃ | ZrO₂ | $n_D$ | $v$ | $i-l$ | $\vartheta$ | $\Delta v$ |
|---|---|---|---|---|---|---|---|---|
| B 38 | 71.8 | 23.4 | 4.8 | 1.5595 | 59.0 | e | 0.527 | −9.8 |
| W 556, B 39 | 68.5 | 22.4 | 9.1 | 1.5630 | 58.0 | f | 0.531 | −8.4 |
| W 560, B 40 | 65.6 | 21.4 | 13.0 | 1.5746 | 56.2 | g | 0.533 | −9.1 |
| B 43 | 75.0 | 15.9 | 9.1 | 1.5449 | 57.5 | h | 0.530 | −9.5 |

The glasses listed in this table have the common characteristic that the content of boric acid anhydride is substantially increased while the content of alkali carbonate is strongly decreased.

Table 4
[In percent by weight]

| Melt No. | B₂O₃ | CaO | La₂O₃ | ZrO₂ | $n_D$ | $v$ | $i-l$ | $\vartheta$ | $\Delta v$ |
|---|---|---|---|---|---|---|---|---|---|
| Ko 368 | 33.6 | 8.9 | 42.6 | 14.9 | 1.7685 | 48.3 | m | 0.551 | −6.6 |
| Ko 371 | 36.3 | 5.4 | 41.7 | 16.6 | 1.7586 | 48.7 | n | 0.551 | −6.2 |
| Ko 373 | 36.8 | 4.8 | 41.7 | 16.7 | 1.7574 | 48.6 | o | 0.548 | −8.0 |

Table 5
[In percent by weight]

| Melt No. | Ko 387 | Ko 393 | Ko 395 | Ko 397 | Ko 398 |
|---|---|---|---|---|---|
| B₂O₃ | 24.8 | 22.9 | 22.9 | 26.0 | 25.0 |
| CaOB₂O₃ | 14.9 | 13.8 | 13.8 | 15.7 | 15.0 |
| La₂O₃ | 39.7 | 45.7 | 45.7 | 41.6 | 40.0 |
| ZrO₂ | 15.8 | 16.6 | 16.6 | 8.35 | 10.0 |
| PbO | 4.8 | | | | |
| Al₂O₃ | | 1.0 | | | |
| BaO | | | 1.0 | | |
| Nb₂O₅ | | | | 8.35 | |
| Ta₂O₅ | | | | | 10.0 |
| $n_D$ | 1.7739 | 1.7860 | 1.7857 | 1.7669 | 1.7614 |
| $v$ | 46.2 | 47.2 | 47.2 | 44.7 | 47.2 |
| $i-l$ | $p$ | $q$ | $r$ | $s$ | $t$ |
| $\vartheta$ | 0.559 | 0.552 | 0.553 | 0.555 | 0.553 |
| $\Delta v$ | −3.9 | −7.1 | −6.5 | −7.8 | −6.5 |

The boric acid content of the glasses of Table 5 is substantially less than that of the glasses of Tables 1 to 4 inclusive. Calculating the boric acid with that in the alkaline earth borates, these glasses are characterized in a boric acid content between 25% and 40%, an alkaline earth oxide content between 2.5% and 10%, a lanthanum oxide content between 35% and 45%, a zirconium oxide content between 4% and 20%. Besides, the glasses can contain lead oxide, tantalum oxide or niobium oxide or mixtures thereof.

It is to be understood that the glasses of our invention can moreover contain additions of silica, aluminum oxide and other known stabilizers in small amounts usually used for this purpose as, for example, not over 5%. The glasses are colorless, stable and resistant to chemical influences.

Through our invention glasses are provided which enable the lens designer to more readily compensate and correct chromatic aberrations in lens systems.

Having described our invention, what we claim is:

1. Optical crown glass with anomalous partial dispersion consisting essentially of from about 47% to 75% by weight of boric acid anhydride, from about 4% to 17% by weight of zirconium oxide and from about 15% to 41% by weight of an alkali carbonate and of a mixture of lanthanum oxide and alkaline earth oxide in amount from about 35% by weight to about 52.5% by weight in which mixture the alkaline earth oxide does not exceed 10% by weight of the glass.

2. The optical crown glass of claim 1 in which the alkali carbonate is from about 16% to 33% by weight of lithium carbonate.

3. The optical crown glass of claim 1 in which the alkali carbonate is from about 36% to 41% by weight of sodium carbonate.

References Cited in the file of this patent

UNITED STATES PATENTS 2,678,281   Geffcken et al. _____ May 11, 1954

OTHER REFERENCES

De Paolis Abstract 700156, published December 6, 1949.